(12) United States Patent
Burling et al.

(10) Patent No.: US 8,182,856 B2
(45) Date of Patent: *May 22, 2012

(54) STABILIZERS USEFUL IN LOW FAT SPREAD PRODUCTION

(75) Inventors: Hans Burling, Viby J (DK); John Charles Madsen, Viby J (DK); Henrik K. Frederiksen, Viby J (DK)

(73) Assignee: Arla Foods AMBA, Viby J (DK)

( * ) Notice: Subject to any disclaimer, the term of this patent is extended or adjusted under 35 U.S.C. 154(b) by 0 days.

This patent is subject to a terminal disclaimer.

(21) Appl. No.: 12/504,522

(22) Filed: Jul. 16, 2009

(65) Prior Publication Data

US 2009/0311410 A1    Dec. 17, 2009

Related U.S. Application Data

(63) Continuation of application No. 10/975,994, filed on Oct. 29, 2004, now Pat. No. 7,579,034.

(60) Provisional application No. 60/515,432, filed on Oct. 30, 2003.

(51) Int. Cl.
    *A23C 21/00* (2006.01)
(52) U.S. Cl. .......................... 426/583; 426/656; 426/657
(58) Field of Classification Search ................... 426/583, 426/656
    See application file for complete search history.

(56) References Cited

U.S. PATENT DOCUMENTS

| | | | |
|---|---|---|---|
| 3,637,643 A | | 1/1972 | Wingerd et al. |
| 3,791,283 A | * | 2/1974 | Moreno et al. ................. 530/414 |
| 4,518,616 A | * | 5/1985 | Czulak ............................. 426/40 |
| 4,990,355 A | | 2/1991 | Gupta et al. |
| 5,707,668 A | | 1/1998 | Andersen |
| 5,747,647 A | | 5/1998 | Stack et al. |
| 5,858,441 A | | 1/1999 | Reddy et al. |
| 5,912,040 A | * | 6/1999 | Girsh ............................. 426/583 |
| 6,613,377 B2 | | 9/2003 | Wu |
| 7,579,034 B2 | * | 8/2009 | Burling et al. ................. 426/603 |
| 2001/0053398 A1 | * | 12/2001 | Soeda ............................. 426/34 |
| 2003/0091722 A1 | | 5/2003 | Foegeding et al. |

FOREIGN PATENT DOCUMENTS

| | | |
|---|---|---|
| EP | 0076549 B1 | 4/1983 |
| EP | 0327 225 A2 | 8/1989 |
| EP | 0355058 | 2/1990 |
| EP | 0 398 408 A2 | 11/1990 |
| EP | 459566 A1 | 12/1991 |
| EP | 0441494 | 8/1994 |
| EP | 1065938 B1 | 1/2001 |
| EP | 1677613 | 7/2006 |
| JP | 02-005823 A | 1/1990 |
| JP | 03-007538 A | 1/1991 |
| JP | 04-227842 | 8/1992 |
| JP | 04-228051 | 8/1992 |
| JP | 10-505501 A | 6/1998 |
| JP | 2001-299212 A | 10/2001 |
| SE | 7216387-6 | 12/1976 |
| WO | WO 96/08156 A1 | 3/1996 |
| WO | WO 2004/056215 | 7/2004 |
| WO | WO 2005/002350 | 1/2005 |
| WO | WO 2005/016015 | 2/2005 |
| WO | WO 2005/041676 | 5/2005 |

OTHER PUBLICATIONS

Webb, B. And Whittier, E. 1970. ByProducts from Milk, 2nd edition. The AVI Publishing Company, Inc., p. 349-353.*
International Preliminary Report on Patentability dated May 1, 2006, from PCT application PCT/DK2004/000752.
Karleskind, D. et al., *"Emulsifying Properties of Lipid-Reduced, and Calcium-Reduced Whey Protein Concentrates"*, J. of Food Science, Jan./Feb., pp. 54-58 (1996), XP-000581258.
Derwent Abstract of SU 1329743 (Aug. 15, 1987), XP-002313294.
Britten, et al., *"Acid-induced Gelation of Whey Protein Polymers: Effects of pH and Calcium Concentration During Polymerization"*; Food Hydrocolloids, vol. 15, pp. 609-617 (2001).
Tossavainen, et al., *"Effect of Milk Protein Products on the Stability of a Model Low-Fat Spread"*, International Dairy Journal, vol. 6, No. 2, pp. 171-184 (1996).

* cited by examiner

*Primary Examiner* — Carolyn Paden
(74) *Attorney, Agent, or Firm* — Finnegan, Henderson, Farabow, Garrett, & Dunner LLP

(57) ABSTRACT

The present invention relates to methods for producing low fat spread emulsions stabilized with dairy proteins. The water phase is stabilized by heat denatured whey proteins at low calcium concentrations. After heat treatment pH of the water phase is adjusted to neutral or acid conditions. The present invention also relates to methods for producing a whey protein product that can be used as a stabilizing food ingredient.

10 Claims, 3 Drawing Sheets

*Figure: Effects of salts on cold gelation, pH 6.5 and 4 % protein content*

Explanation

○ Transparent liquid  ♦ Translucent gel  × White particulate gel structure

STABILIZERS USEFUL IN LOW FAT SPREAD PRODUCTION

CROSS-REFERENCE TO RELATED APPLICATION

This is a continuation of application Ser. No. 10/975,994, filed Oct. 29, 2004, now U.S. Pat. No. 7,579,034 which claims priority of provisional Application No. 60/515,432, filed Oct. 30, 2003, both of which are incorporated in their entirety herein by reference.

TECHNICAL FIELD OF THE INVENTION

The present invention relates to the field of stabilisers. In particular, the invention concerns methods for producing a stabiliser of dairy origin as well as low fat spreads stabilised with proteins of dairy origin.

BACKGROUND OF THE INVENTION

Numerous attempts have been made over the years to obtain a low fat spread with a taste, mouthfeel, structure, consistency, etc. that resembles butter as closely as possible. A number of features must be present in the final product in order to obtain this "butter feeling":
- spreadability at a temperature of about 5-25° C.,
- easy to spread without spontaneous water release,
- a creamy sensation devoid of both a gritty and a crystalline structure,
- melting easily in the mouth,
- devoid of a "sticky" sensation in the mouth
- devoid of any unpleasant taste or off-taste,
- preferably devoid of additives of non-dairy origin,
- relatively easy and cheap to produce,
- a "butter like" sensation according to a test panel Finally, the product should of course have a significantly lower fat content than butter.

A large number of technical problems must thus be solved in order to arrive at the desired product. Thus far, it has not been possible to produce a product that fulfils most or all of these criteria in a satisfactory manner. The large number of low fat spreads on the market, the growing concern for obesity and excessive caloric intake in general clearly indicates the need in the art for presenting the consumers with a satisfactory low fat spread product.

It has long been known in the art to stabilise the water phase of low fat spread emulsions in order to avoid phase separation and release of water during spreading. Well known stabilisers include hydro-colloids like starch, and carrageenan, and proteins like gelatine.

Most often, gelatine (in a concentration of about 3%) is used as a stabiliser of low fat spreads. An advantage of using gelatine is that a very low protein concentration is sufficient in order to achieve the desired consistency. Another advantage is that this approach is relatively cheap and the gelatine protein is almost flavour neutral. A disadvantage is that gelatine is of animal origin and some countries have therefore contemplated prohibiting the use of gelatine as a food ingredient due to the risks of e.g. BSE associated with such products, especially if the gelatine is derived from cattle bones. Vegetarians and health conscious consumers tend to prefer products devoid of gelatine.

It is also well known to stabilise the water phase of low fat spreads with proteins of dairy origin.

In SE-72116387 it is disclosed to use high contents (12-13% in the water phase) of Na-caseinate or Na-caseinate formed in situ from acidified and precipitated skimmed milk or buttermilk. A disadvantage of this approach is that production costs are increased with increasing protein contents. Also, high Na-caseinate contents result in a chalky mouthfeel and bitterness.

Several methods for producing whey protein "gels" are described. Whey protein gels known in the art have been used as a food ingredient for stabilisation of various product types such as in bakery and in meat products In Int. Dairy Journal 6 (1996), 171-184 it is disclosed that the water phase of a low fat spread should contain about 20-25% native whey protein to reach a viscosity of 1.7 Pa s in order to create a stable water phase. The water phase can also be stabilised by a concentration of at least about 13% Na caseinate. However, when the final product comprises high protein contents (>8%), it tends to get an undesirable off taste or off flavour. Production costs are likewise increased with high protein contents. Therefore, low fat spreads stabilised with low concentrations of proteins of dairy origin need addition of additional stabilizers in order to arrive at an acceptable product.

Addition of various other additives such as stabilisers, thickeners, flavours, colours, etc. has thus far been considered mandatory in low fat spread production. Consequently, no low fat spreads stabilised with only small amounts of whey protein (<8%) are on the market.

Various disadvantages are, however, connected with addition of non-dairy additives. The identity of non-dairy additives must e.g. be listed on the declaration of contents and there is therefore a need in the art for low fat spreads that can be stabilised exclusively with e.g. proteins of dairy origin. In this respect it is worth noting that most consumers prefer natural products preferably without additives. There is furthermore a need in the art for finding a relatively cheap and simple method for producing such products.

There is also a need in the art for developing methods for cheap and efficient production of whey protein gels useful as a stabilising ingredient with a universal applicability within the food industry.

EP459566 A1 discloses a low fat spread comprising 10% fat and 13-14% calcium free denatured whey protein. A method involving shearing of the water phase is disclosed for producing a translucent thixotropic gel structure consisting of a viscous solution of particulate aggregates. A thixotropic gel in this document is understood as a gel that gradually recovers its viscosity when shearing of the gel is stopped. After the gel has been formed, mixing with fat phase is performed to obtain the low fat spread. The whey protein gel thus formed is a high concentration protein gel consisting of a web of mechanically broken protein strands.

U.S. Pat. No. 858,441 discloses a low fat spread comprising less than 35% fat, 0.05-0.5% commercially available heat denatured whey proteins as well as gelling agents (gelatine, starch, etc.) and (optionally) thickeners. A method is disclosed wherein the fat phase is heated to 60° C. The aqueous phase is then heated to 65° C. and slowly added to the fat phase. Another procedure is disclosed wherein oil and aqueous phase are mixed at 45° C.

EP 0076549 B1 discloses a low fat spread comprising 20-60% fat, 0.1-2% heat-denatured whey protein as well as a an appropriate amount of a thickening agent such as gelatine. A process for preparing the low fat spread is also disclosed, said process comprising first mixing a solution comprising whey proteins with fat under high pressure and subsequently subjecting this emulsion to heat treatment and pH adjustment to a pH of 3.5-6.

EP 1065938 B1 discloses a phase inverted oil-in-water low fat spread comprising 50-85% fat and 0.02-10% heat treated butter milk protein as well as additives such as emulsifiers and flavours. A method for producing a low fat spread comprising emulsifiers and involving super cooling of the fat phase is also disclosed. In this method, a fat phase comprising emulsifiers is mixed with a water phase comprising 2.2-2.5% buttermilk powder and the emulsion is subsequently heated to 75-80° C. In another embodiment, fat dairy cream is acidified to a pH of 5.2-5.3 using citric acid or a bacterial culture. This soured cream solution is then mixed with fat to reach the desired fat content and heated to a temperature of 75° C. before and/or after addition of additional fat.

Britten & Giroux *Food Hydrocolloids* 15 (2001) 609-617 discloses the effects of pH and calcium concentration on acid-induced gelation of whey proteins. The gels disclosed therein can be used as a stabilising food ingredient in dairy products of the o/w emulsion types, in particular yoghurt. A method is disclosed wherein an aqueous solution of 80 g whey protein/l with a calcium concentration of 0.6 mM is adjusted to a pH of 6.5; 7.5; and 8.5, respectively. The solution is heated at 90° C. for 15 minutes and subsequently cooled to 5° C. After cooling, pH is adjusted to 7.0 and without any further dilution, the solution is subjected to centrifugation at 20.000×g for 15 minutes in order to remove large insoluble protein aggregates, which were formed under all conditions assayed. Gel formation takes place immediately upon mixing with calcium rich yoghurt. The gel is mixed with yoghurt thereby thickening the yoghurt as well as increasing its protein content.

US2003/0091722 discloses whey protein products useful as a food ingredient. WPI (spray dried crude whey) from DAVISCO served as the protein source. Calcium is not removed from this product. In the product specification, DAVISCO states that the calcium content of the whey powder is about 0.1%, corresponding to about 0.004% or about 1.1.4 mM calcium in a 4% protein solution. A method is disclosed wherein a solution comprising 4% whey proteins is adjusted to a pH of about 8.0. This solution is heated to 75-95° C. in 10-120 minutes and thereafter cooled to room temperature. The heat treated solution is subsequently diluted to a protein concentration of about 1.5-3.5% protein and pH is adjusted to about 5.0-8.0 followed by a second heating step. It is disclosed that this two step heating process results in an immediate formation of a gel structure after the second heating step.

SUMMARY OF THE INVENTION

The present invention relates to a method for producing low fat spreads with excellent organoleptic properties, wherein the water phase of the emulsion is stabilised by a heat treated calcium-reduced whey protein product and wherein said method comprises a single heating step.

The starting material for producing the water phase is a solution comprising 5-9% whey protein with a calcium concentration of about 0.0 to 1.4 mM. The pH of this solution is adjusted to 7 to 9. This relatively high pH value and low calcium concentration is believed to favour polymerisation of β lactoglobulin by disulfide bonds (primary aggregation) during the subsequent heating step.

Heating of this solution takes place at a temperature of about 50 to 100° C. in about 0.15 to 30 minutes. Normally, primary aggregates will quickly form secondary aggregates. However, a combination of low calcium concentration and high pH value ($\geq 7$) prevents spontaneous formation of secondary aggregates. After the heating step, the solution must be cooled to a temperature of 1 to 40° C. in order to stop the denaturation process and to avoid particle formation.

The cooled solution is adjusted to a pH value of 3 to 7 and the protein concentration is diluted to 4 to 7%. This last step (acid induced gelation optionally combined with addition of NaCl) is believed to induce formation of a fine-stranded gel structure (secondary aggregation). What is obtained in this step is a low viscous liquid, which will gradually turn into a gel within about 48 hours at a temperature of about 4° C. In order to obtain the desired low fat spread product, the low viscous protein solution is preferably mixed with fat phase before the gel formation is completed. Mixing thus preferably takes place within two hours after onset of acid induced gelation. After about 48 hours, preferably at about 4° C., gel formation in the dispersed water droplets is completed and a low fat spread with the desired properties is obtained.

This gel is applicable as a food ingredient in stabilisation of emulsion types of the o/w type as well as the w/o type.

What is achieved with the present invention is production of a low fat spread stabilised by an irreversible whey protein gel structure thus providing an alternative to using e.g. gelatine as a stabiliser of low fat spreads. Upon consumption by the consumer, the low fat spread will melt in the mouth in a similar way as butter. If no other additives are added, a low fat spread with excellent organoleptic properties is obtained, wherein said low fat spread is stabilised only with ingredients of dairy origin.

The present invention furthermore relates to low fat spreads comprising low amounts of calcium reduced heat treated whey proteins.

The present invention finally relates to methods for producing whey protein products as well as use of these products for stabilising various product types.

DETAILED DESCRIPTION OF THE INVENTION

Figure 1:
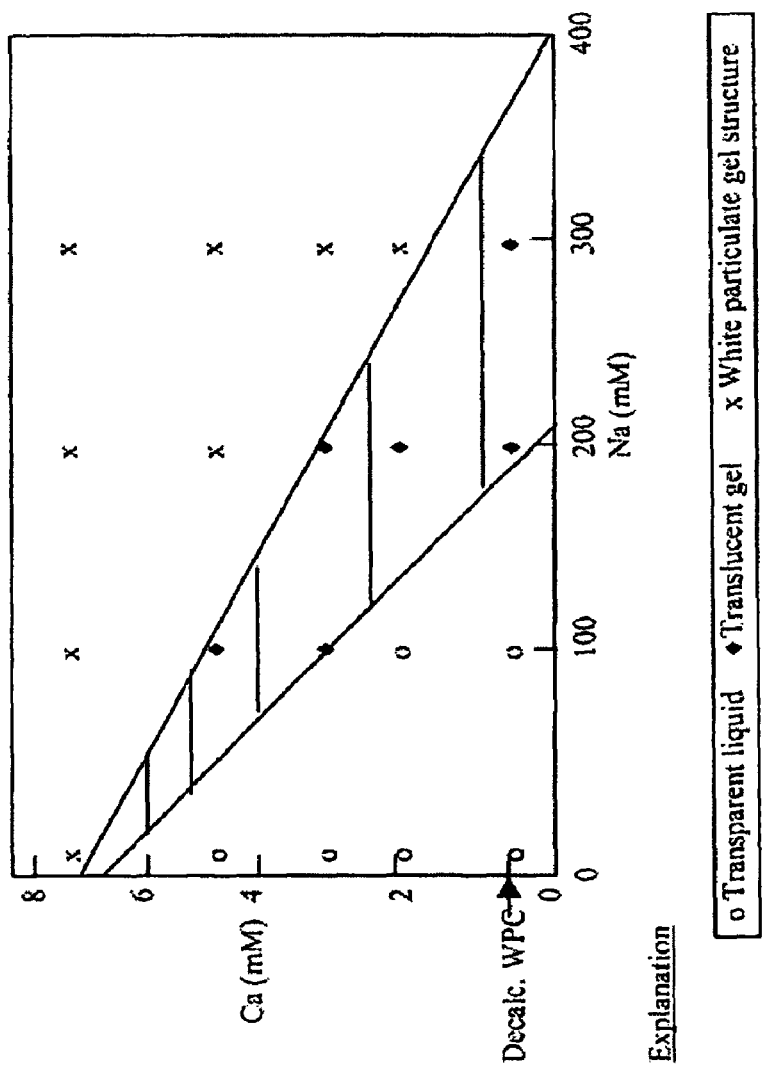
FIG. 1: Effects of salts on cold gelation; pH 6.5 and 4% protein content.

The present invention is based on a unique rationale in order to succeed producing a whey protein gel suitable for stabilising of low fat spreads using only small amounts of whey protein. This is achieved by creating a low calcium water phase comprising a fine-stranded gel of heat-denatured whey protein product. This gel has excellent water binding properties at low protein concentrations.

This fine-stranded gel is based on the "cold gelation" concept which is already known in the art (De Wit, 1981). Salt-induced as well as acid induced cold gelation has been described, as in e.g. EP1281322 A1. So far, it has not been possible to produce a low fat spread having a low concentration of whey protein wherein addition of further stabilizers has not been mandatory.

A number of parameters are important in connection with the cold gelling process in production of low fat spreads:
 low calcium ion concentration
 protein concentration
 protein types
 pH≧7, or >7 during heat treatment
 temperature of heat treatment
 time of heat treatment
 cooling
 adjusting the protein concentration after heat treatment
 adjusting pH to ≦7, or <7 after heat treatment
 mixing with fat phase Calcium ion concentration of the water phase must be kept at a low level. A particulate gel structure with poor water retention properties is obtained if the calcium content has not been reduced sufficiently. Calcium can be removed from the whey protein using any conventional procedure, e.g. ion exchange. The content of free calcium in the whey protein product can also be reduced by addition of e.g. citrate salts. Solutions of calcium depleted whey protein used as a starting material for producing low fat spreads according to the invention has a calcium concentration in the range of 0.0-1.4 mM, preferably 1.4; 1.3; 1.2; 1.1; 1.0; 0.9; 0.8; 0.7; or 0.6 mM or less, and even more preferably 0.5; 0.4; 0.3; 0.2; mM or less and most preferably 0.10; 0.09; 0.08; 0.07; 0.06; 0.05; 0.04; 0.03; 0.02; or 0.01.4 mM or less. The effect of the calcium concentration on the gel formation is analysed in the Examples.

At moderately high calcium ion concentrations (about 1.5-10 mM), secondary aggregation of unfolded proteins starts taking place resulting in gel particle formation. High protein concentrations further enhance this effect. A calcium induced gel particle formation usually results in gel particles with big pores and thus poor water holding properties, not suitable for stabilising the water phase of a low fat spread. Secondary aggregation can also be triggered by sodium ions, but the process is catalyzed about one hundred times more efficient with calcium ions. It is thus of interest to keep especially calcium concentrations and proteins concentrations low in order to avoid formation of gels with poor water holding properties. Calcium ions may be removed by any conventional techniques. Decalcification of crude whey proteins preferably results in a reduction of calcium content by 50-99.5%, preferably >95%.

If the content of free calcium ions is sufficiently low, a "fine stranded gel" can subsequently be formed. A fine-stranded gel is characterized by comprising small pores formed during the secondary aggregation. This gel type is translucent and can withstand mechanical breakage during spreading of the low-fat spread.

Calcium contents (mM Ca in 4% protein solution) are as follows in different whey protein products: WPC 35: 27; WPC 65: 6.8; WPC 80: 5.0; WPI (whey prot. isol.): 1.1; Decalcified WPC 80: 0.3.

pH must be ≧7, preferably >7 during heat treatment It has been shown that relatively high pH values increase the reactivity of free thiols of unfolded β lactoglobulin resulting in primary aggregation (Britten & Giroux). Low calcium contents increase the stability of the formed primary aggregates. Preferred pH values are in the range of 7-9 and thus include: 7.0; 7.1; 7.2; 7.3; 7.4; 7.5; 7.6; 7.7; 7.8; 7.9; 8.0; 8.1; 8.2; 8.3; 8.4; 8.5; 8.6; 8.7; 8.8; 8.9; and 9.0. The invention may also work with pH values that deviate from this range.

The protein concentration of the whey protein solution before and during heat treatment should preferably be about 5 to 10%. Preferred protein concentrations thus include: 5.0; 5.1; 5.2; 5.3; 5.4; 5.5; 6.0; 6.1; 6.2; 6.3; 6.4; 6.5; 7; 7.5; 8; 8.5; 9; and 10%. This protein concentration range ensures that the protein filaments obtained in the primary aggregation process will be as long as possible (Jul & Kilara J. Agric. Food Chem. (1988) 465: 3604-3608). Protein filaments are the building blocks of the gel structure. At protein concentrations above about 9% the secondary structures may start to form after heat treatment at high pH values. At a protein concentration below 5%, the protein filaments will probably not become sufficiently long. However, it is conceivable that the invention will work even with protein concentrations that deviate from this range.

Heat treatment. The whey proteins are denaturated at 50-100° C. at 0.15-30 minutes in order to obtain a partial or complete unfolding of the proteins. Preferred temperatures are: 45, 50, 55, 60, 65, 70, 75, 76, 77, 78, 79, 80, 81, 82, 83, 84, 85, 90, 95, 95, 96, 97, 98, 99, 100, 105, 110, 115, 120, 125° C. Protein unfolding or primary aggregation, or formation of protein filaments during heat treatment is dependent upon several parameters such as the type of protein, the temperature, the period of time, etc. This concept is explained in Paulsson et al. *Thermochimica Acta,* 1985, 435-440. It thus follows that it is conceivable that the invention will work even if temperatures above 100° C. or below 50° C. are employed, e.g. when very short or very long periods of time are used, respectively. Temperatures between 50 and 100° C. and periods of time between 0.15 and 30 minutes are therefore selected because they are well suited for use in the industry.

Likewise, depending on the temperature employed during the heating step, the period of time may be 1, 2, 3, 5, 6, 7, 8, 9, 10, 11, 12, 13, 14, 15, 16, 17, 18, 19, 20, 21, 22, 23, 24, 25, 26, 27, 28, 29, or 30 minutes. It also follows that the heating time may be even longer, e.g. 1 hour, 1.5 hours, 2, hours or more, but very long or very short periods of time tends to be impractical for use in the industry.

It is believed that β lactoglobulin is the protein type from whey primarily responsible for gel formation during the cold gelling procedure. It thus follows that fully or partially purified β lactoglobulin may be used in addition to or in stead of using whey proteins. If the whey proteins are enriched with β lactoglobulin then the required protein content can be decreased up to about 50% compared to using crude whey protein. Using β lactoglobulin rather than crude whey proteins is believed to work just as well in connection with the present invention (maybe even better) but the production costs will increase. Crude whey comprise the following proteins: β lactoglobulin (about 50%); a lactalbumin (about 20%); gluco macropeptides resulting from cleavage of kappa casein (15%) immunoglobulins (about 5%); serum albumin (about 5%). β lactoglobulin may thus constitute about 30, 40, 50, 55, 60, 65, 70, 75, 80, 85, 90, 95, or even up to 100% of the protein content of the whey protein starting material. It thus follows that the term "protein" used herein refers to whey proteins that may or may not be enriched with β-lactoglobulin.

It is believed, and empirically found, that a pH≧7, preferably >7 during the heating step promotes formation of soluble aggregates of denatured whey protein polymers by intermolecular disulfide bonds. These aggregates or filaments are of sub micron size, normally 20-100 nanometer and they tend to be most stable at relatively alkali conditions (pH≧7). Preferred pH values during the heating step thus include: 7.0; 7.1; 7.2; 7.3; 7.4; 7.5; 7.6; 7.7; 7.8; 7.9; 8.0; 8.1; 8.2; 8.3; 8.4; 8.5; 8.6; 8.7; 8.8; 8.9; and 9.0. This pH range has been found to work well, but it is conceivable that the invention will also work with pH values that deviate from this range. However, it has previously been shown that it is impossible to form soluble aggregates at pH values below 7.

Cooling. After heat treatment, the solution must be cooled in order to avoid secondary aggregation. The solution must be cooled to a temperature of from about 0 to 40° C., including 0, 1, 2, 3, 4, 5, 6, 7, 8, 9, 10, 11, 12, 13, 14, 15, 16, 17, 18, 19, 20, 25, 30, 35, 40° C. A preferred temperature range is from about 1-25° C., a more preferred temperature range is from about 1-17° C., and the most preferred temperature range is from about 1-10° C. The cooling should preferably be carried out in a fast and efficient manner—especially if the final cooling temperature is relatively high, i.e. from about 30 to 40° C.

The protein concentration should be adjusted after heat treatment. Preferred protein concentrations include: 3.0; 3.5; 4.0; 4.5; 4.6; 4.7; 4.8; 4.9; 5.0; 5.1; 5.2; 5.3; 5.4; 5.5, 5.6; 5.7; 5.8; 5.9; 6.0; 6.1; 6.2; 6.3; 6.4; 6.5; and 7.0%. This range of protein concentrations after heat treatment have shown to result in gels with good properties (appropriate gel strength while retaining the ability to melt in the mouth) but it is conceivable that the invention will also work at protein concentrations that deviate from this range.

After heat treatment, the pH of the solution is adjusted to ≦7, preferably <7. This pH adjustment is believed to promote formation of secondary whey protein aggregates of fine stranded character resulting in a gel with good water retention properties. A preferred range pH range is 5.2-7 and preferred pH values thus include 5.0; 5.1; 5.2; 5.3; 5.4; 5.5; 5.6; 5.7; 5.8; 5.9; 6.0; 6.1; 6.2; 6.3; 6.4; 6.5; 6.6; 6.7; 6.8; 6.9 and 7.0. It is plausible that the invention may even work at pH values above 7. The isoelectric point of β lactoglobulin is about 5.2 and at pH values at this value and below, the proteins will gradually start to precipitate and loose their ability to form gel structures with good water retention properties. It is however conceivable that the invention might also work, at pH values slightly below 5.2. The pH may be adjusted with any acid, e.g. citric acid or lactic acid.

What is thus achieved is a low viscous water phase comprising proteins. The inventors have surprisingly found that when the assay conditions of the invention are followed, this low viscous water phase will gradually turn into a stable gel within about 48 hours at about 5° C. Mixing the water phase with the fat phase before the cold gelling process is completed thus offers an advantage over previously known methods for producing low fat spreads stabilised with whey protein gels namely because the low viscous water phase can be distributed in a more even fashion in the fat phase than can be achieved when mixing fat phase with higher viscous protein products.

The low fat spread product thus obtained unexpectedly exhibits a much better butter-like sensation to the consumers, probably because the in situ gelified water phase irreversibly breaks down in the mouth. The time range for mixing the heat treated water phase with fat phase is thus about 0-48 hours, including: 0.1; 0.2; 0.3; 0.4; 0.5; 0.6; 0.7; 0.8; 0.9; 1; 2; 3; 4; 5; 6; 7; 8; 9; 10; 12; 14; 16; 18; 20; 22; 24; 26; 28; 30; 32; 34; 35; 38; 40; 42; 44, 46; and 48 hours. The invention might however work, even if the two phases are mixed after the gelling procedure has been completed.

Likewise, the gel is applicable as a universal stabilising food ingredient. Thus, not only did the inventors develop a method for producing a low viscous gel with a low protein concentration with the surprising feature that it only gradually turns into a stable gel. But they did also develop a method for producing a gel suitable as a stabilising food ingredient for producing products of the w/o type as well as the o/w type. Food products of the o/w type include cream cheese, fresh cheese, quarg, yellow cheese, desserts, mayonnaises, dressings, brunch products, yoghurts, and fermented milk products.

Whey protein gels as herein described are likewise applicable as a stabilizer of e.g. meat. Injection of denatured whey protein solutions according to the invention into the meat may result in decreased cooking loss. A more even distribution of the formed gel structure in the meat structure is thereby obtained. Processed meat products such as e.g. sausages may also be stabilized with whey protein gels.

The water phase is finally mixed with the fat phase and optionally filled into containers. The two phases should preferably be mixed within 48 hours, more preferably within 24 hours, even more preferably within 12 hours, and most preferably within 6, 5, 4, 3, 2, or 1 hour. Mixing the two phases can take place using any standard equipment used in the dairy or margarine industry. High intensity mixing will result in increasingly smaller water phase inclusions. After mixing, the low fat spread is stored at 0-30° C., preferably at 4, 5, 6, 7, 8, 9, 10, 11, 12, 13, 14 or 15° C. The gelling process occurs fastest at relatively high temperatures, but it is however preferable to store the product at relatively low temperatures during the gelling process in order to increase the viscosity of the fat phase and in order to increase shelf life of the product. To ensure that the gelation process has been completed or almost completed, the mixed product should be stored for at least 12 hours, more preferably at least 24 hours, and most preferably at least 48 hours before it is sold and/or consumed.

DEFINITIONS

Cold gelation: Cold gelation means that the denaturation/unfolding of the whey proteins is separated in time from the secondary aggregation step. This is the case, when the proteins are denatured at a relatively high pH and at a low calcium concentration. The secondary aggregation is initiated by a decrease in pH, and/or by adding salt such as NaCl. Cold gelation results in fine stranded whey protein gels with good water binding properties rather than particulate gels with large pores which would otherwise be the case if the secondary aggregation is catalysed by high calcium contents. Cold gelation is achieved by the steps performed in the methods of the present invention.

It is of particular importance that the calcium concentration is kept very low, the protein concentration is kept relatively low and the pH value is kept at or above 7 during the heat treatment. After the heat treatment, protein concentration is adjusted and pH is adjusted to a value at or below 7. What is then achieved is a low viscous protein solution that will gradually turn into a firm gel with excellent water retention properties. If the gel is used for low fat spread production then it is advantageous to mix the water phase containing proteins with the fat phase before the gelling process has run to completion. Whey protein gels are thus useful as a universal food ingredient for stabilising o/w as well as w/o emulsion types.

The whey protein gels of the present invention are characterised by being clear gels consisting of polymeric protein threads forming a "web" wherein the pores have a diameter of about 20-100 nm (Langton & Hermansson *Food Hydrocolloids* (1992) 5: 523-539; Fine-stranded and particulate gels of betalactoglobulin and whey protein at varying pH). This gel has excellent water retention properties.

A particulate gel is "cloudy" or white and characterised by being composed of particles linked to each other on a string to form a coarse net work and having pores at a size of about 1 to 10 µm. This gel type obviously has poor water retention properties. This gel type is most often formed if the gel has been prepared in a different manner than what is disclosed in connection with the present invention.

The principle of cold gelation has been described in greater detail in e.g. De Wit 1981, Neth. Milk Dairy Journal, 35, p 47-64, UK Patent Application GB 2063273, and a thesis by Arno Alting, Wageningen Food Center, the Netherlands, 2003.

Whey protein: Whey is a watery by-product of cheese manufacturing comprising the proteins (whey proteins) from milk that remain in solution after removal of casein. The starting material for whey protein used in connection with the present invention may be in the form of unmodified whey, or partially or fully purified whey proteins. Powders as well as aqueous solutions may be used. Whey proteins may furthermore be enriched with β-lactoglobulin.

Emulsion types (w/o and w/o): In water-in-oil (w/o) emulsions, the fat phase is the continuous phase with water phase particles embedded therein. In oil-in-water (o/w) emulsions, water is the continuous phase with fat phase particles embedded therein. It is conceivable that low fat spreads may be in the form of an o/w emulsion, but most often it will be in the form of an w/o emulsion. It is well known in the art to produce e.g. low fat spreads by employing a step of phase inversion during e.g. cooling and crystallization.

Low fat spread is an emulsion of a water phase and a fat phase. Low fat spread furthermore denotes a product type that shares features with butter and can be used in similar applications such as e.g. in bakery, cooking, frying, or spreading on a slice of bread. The most important feature of low fat spread is that the fat content of the product is significantly lower than in butter. Usually low fat spreads will have fat contents of at least 10% and up to 80%. A low fat spread will most preferably have a fat content of about 10, 15, 20, 25, 30, 35, 36, 37, 38, 39, 40, 41, 42, 43, 44, 45, 50, 55, 60, 65, 70, 75, or 80% w/w.

Fat: The fat phase may be constituted by any source of fat or oil, preferably in the triglyceride form, of either vegetable and/or animal origin. The fat phase may thus be a mixture of any fat source. Examples of sources of fat include but are not limited to: dairy fat, vegetable fats and oils such as palm oil, coconut oil, soybean oil, sunflower oil, olive oil, thistle oil, grape kernel oil, sesame oil, rape seed oil, etc.

Dairy fat: Dairy fat is derived from milk obtained from a lactating mammal such as e.g. cow, goat, sheep or lama. Dairy fat may be added in the form of e.g. butter, cream, milk, cream cheese or butter oil. Butter oil contains virtually no water whereas e.g. butter usually contains about 10-20% water.

Butter: Butter is a dairy product made by churning fresh cream from cattle, sheep, goat, or lama. It consists of an emulsion of water and milk proteins in a matrix of fat, with at least 80% being fat and may also comprise a lactic culture and/or salt. It is used as a condiment and for cooking in much the same ways as vegetable oils or lard. Butter is solid but soft at room temperature, and melts easily. Its colour is generally pale yellow, but can vary from deep yellow to nearly white (butter is typically paler in the winter, for example, when dairy cattle feed on stored hay rather than fresh grass.

Stabilisers: The terms stabilisers and thickeners are used interchangeably throughout this document. Stabilisers include all conventionally used products such as gelatine, starch, inuline, β glucan, guar gum, carrageenan, pectin, gellan gum, agar, alginate, maltodextrin, soy protein, xanthan gum, locust bean gum, microcrystalline cellulose, caseinate, konjac, mannan, carboxy methyl cellulose (CMC), gum arabic (acacia gum), tragacanth, tara gum, karaya gum, processed aucheuma seaweed, dextrin, and bleached starch.

The total amount of stabilisers of non-dairy origin in the final product should not exceed 20%. In addition to stabilisers the low fat spread product may also comprise other additives such as emulsifiers, flavours, colours, preservatives, etc.

Fresh cheese is herein understood as a dairy product type embracing a wide variety of cheeses such as quarg, quarg desserts, cream cheese, fresh cheese, fromage frais, etc. Fresh cheeses thus comprise cheeses ranging in fat content from virtually fat free types to cheeses with a fat content up to 30-40%. After separation or ultrafiltration of the coagulate, the cheeses may be subject to after treatment in order to e.g. modulate shelf life and/or consistency. Likewise, flavours, spices, fruits, vegetables, nuts, chocolate, etc. may be added to the product.

Fermented dairy products comprise a wide variety of dairy products that have been subject to chemical and/or biological fermentation such as, fresh cheese, yoghurt, crème fraîche, sour cream, ymer, etc.

Traditional cheeses comprise a wide variety of dairy products, e.g. cheese types such as cheddar, Gouda, Danbo, Emmenthaler, feta, etc.

Mould ripened cheese comprise a wide variety of dairy products, e.g. cheese types such as gorgonzola, danablu, brie, camembert, etc.

A food product is understood as any eadible processed food product. Examples include dairy products, processed meat products, sweets, desserts, canned products, freeze dried meals, dressings, soups, convenience food, bread, cakes, etc.

In a first aspect, the present invention thus relates to a method for producing a low fat spread comprising 1-7% whey protein, said method comprising the following steps:
(i) preparing an aqueous solution comprising about 5 to 10% whey protein, with a calcium concentration of about 0.0 to 1.4 mM, and a pH value of about 7 to 9;
(ii) heating the solution resulting from step (i) to a temperature of about 50 to 100° C. in about 0.15 to 30 minutes;
(iii) cooling the solution resulting from step (ii) to a temperature of about 1 to 40° C.;
(iv) adjusting the solution resulting from step (iii) to a protein concentration of about 4 to 7%, and a pH value of about 5.2 to 7.0;
(v) mixing the solution resulting from step (iv) with fat phase in order to obtain the low fat spread.

Low fat spreads produced by this method are preferably emulsions of the w/o type. Low fat spreads preferably comprise about 10 to 60% fat, and more preferably about 20 to 60% fat. The protein content of these low fat spreads is preferably about 2-5%. The low fats spreads furthermore may comprise about 0.5 to 4.5% NaCl. The proteins used in this method may furthermore be enriched with β lactoglobulin.

In another embodiment, the solution obtained in step (iv) is mixed with fat phase within 5 hours, more preferably within 2 hours, packed in containers, and preferably stored at about 4 to 10° C. for at least 24 hours before selling and/or consuming the product. When using this approach, the gel formation will take place in the water droplets of the product.

Another embodiment of the method according to the invention is a method for producing a low fat spread comprising 20-60% fat and 2-5% whey protein, said method comprising the following steps:
(i) preparing an aqueous solution of 3 to 10% whey proteins, a pH value of about 7-9, wherein the calcium concentration has been reduced by at least about 50% (1 mM calcium or less), more preferably by at least about 95%.
(ii) heating the solution resulting from step (i) to a temperature of about 50 to 100° C. in 0.15 to 30 minutes;

(iii) cooling the solution resulting from step (ii) to a temperature of 1 to 17° C.;
(iv) adjusting the solution resulting from step (iii) to a protein concentration of about 5 to 7% and a pH value of about 5.5 to 7; and
(v) mixing the solution resulting from step (iv) with fat phase in order to obtain the low fat spread.

In another preferred embodiment, the method is a method for producing a low fat spread comprising about 40% fat and about 3% whey protein, said method comprising the following steps:
(i) preparing a solution comprising about 7.9% whey protein, a calcium concentration of about 0.0 to 1.4 mM, and a pH value of about 8;
(ii) heating the solution resulting from step (i) to a temperature of about 80° C. at about 15 minutes;
(iii) cooling the solution resulting from step (iii) to a temperature of about 10° C.;
(iv) adjusting the solution resulting from step (iii) to a protein concentration of about 5.7%, adjusting pH to a value of about 5.7 by addition of an aqueous solution of lactic acid, and adding NaCl to a concentration of about 1.9%;
(v) mixing about 53 parts of the water phase resulting from step (iv) with about 27 parts butter, and about 17 parts rapeseed oil.

In a most preferred embodiment the low fat spread comprises no other stabilisers than whey protein.

In one particular embodiment, the low fat spread comprises one or more additional stabilisers selected from the group consisting of: gelatine, Na caseinate, inuline, μ-glucan, guar gum, carrageenan, pectin, gellan gum, agar, alginate, maltodextrin, soy protein, xanthan gum, locust bean gum, microcrystalline cellulose, caseinate, konjac, mannan, carboxy methyl cellulose (CMC), gum arabic (acacia gum), tragacanth, tara gum, karaya gum, processed aucheuma seaweed, dextrin, starch, and bleached starch.

In a second aspect, the present invention relates to a product obtainable by a method according to the present invention.

In a third aspect, the present invention relates to a low fat spread, wherein the water phase comprises about 1 to 7% heat treated whey protein and a calcium concentration of about 0.0 to 1.4 mM, and wherein the spread contains no other stabilisers than said whey proteins. Preferably, the pH of the water phase of the low fat spread is below 7. The low fat spread may furthermore comprise whey proteins enriched with β-lactoglobulin. The low fat spread may also comprise about 0.5-4.5% NaCl. The water phase preferably comprises about 100-300 mM salt. The fat fraction of the low fat spread comprises 0-100% dairy fat and 0-100% vegetable fat.

In a preferred embodiment, the low fat spread according to the invention comprises a water content of about 54%, a NaCl content of about 1%, a protein content of about 3%, a content of solid no fats of about 3%, and a fat content of about 40%. Preferably, the fat fraction is composed of about 50-60% dairy fat and about 40-50% vegetable fat, preferably vegetable oil.

In a fourth aspect, the present invention relates to a low fat spread comprising about 20 to 60% fat, wherein the water phase comprises about 1 to 7% heat treated whey protein and a calcium concentration of about 0.0 to 1.4 mM, wherein said low fat spread further comprises at least one stabiliser selected from the group consisting of: inuline, β-glucan, guar gum, carrageenan, pectin, gellan gum, agar, alginate, maltodextrin, soy protein, xanthan gum, locust bean gum, microcrystalline cellulose, caseinate, konjac, mannan, carboxy methyl cellulose (CMC), gum arabic (acacia gum), tragacanth, tara gum, karaya gum, processed aucheuma seaweed, dextrin, starch and bleached starch.

Preferably, the pH of water phase of the low fat spread is below 7. The low fat spread may furthermore comprise whey proteins enriched with β lactoglobulin. The low fat spread may also comprise about 0.5-4.5% NaCl. The fat fraction of the low fat spread comprises 0-100% dairy fat and 0-100% vegetable fat.

In a preferred embodiment, the low fat spread according to the invention comprises a water content of about 54%, a NaCl content of about 1%, a protein content of about 3%, a content of solid no fats of about 3%, and a fat content of about 40%. Preferably, the fat fraction is composed of about 50-60% dairy fat and about 40-50% vegetable fat, preferably rapeseed oil.

In a fifth aspect, the present invention relates to a method for producing a whey protein product comprising the following steps:
(vi) preparing an aqueous solution comprising about 5 to 10% whey protein, a calcium concentration of about 0.0 to 1.4 mM, and a pH value of about 7 to 9;
(vii) heating the solution resulting from step (vi) to a temperature of about 50 to 100° C. in about 0.15 to 30 minutes;
(viii) cooling the solution resulting from step (vii) to a temperature of about 1 to 40° C.;
(ix) adjusting the solution resulting from step (viii) to a protein concentration of about 4 to 7%, and a pH value of about 5.2 to 7.0.

In a preferred embodiment, this method comprises the following steps:
(vi) preparing an aqueous solution of about 3 to 10% whey proteins, a calcium concentration of about 0.0 to 1.4 mM, and a pH value of about 7 to 9;
(vii) heating the solution resulting from step (vi) to a temperature of about 50 to 100° C. in about 0.15 to 30 minutes;
(viii) cooling the solution resulting from step (vii) to a temperature of 1 to 17° C.;
(ix) adjusting the solution resulting from step (viii) to a protein concentration of about 5 to 7% and a pH value of about 5.5 to 7.

Preferably, the whey protein is enriched with β lactoglobulin. In another preferred embodiment, the gel further comprises about 0.5 to 4.5% NaCl.

The present invention likewise relates to gel products obtainable by the method of the present invention.

In a sixth aspect, the present invention relates to the use of gel products produced according to the present invention for stabilisation of an emulsion of the o/w type, preferably for stabilisation of a fermented dairy product. Examples of products include: cream cheese, fresh cheese, quarg, yellow cheese, desserts, mayonnaises, dressings, brunch products, yoghurts, and fermented milk products. Gel products according to the invention can also be used for stabilisation of processed meat products and any other food products.

In a last aspect, the present invention relates to any food product comprising a whey protein product according to the present invention

EXAMPLES

Example 1

Effect of Calcium Concentration on the Gel Characteristics During Cold Gelation of Whey Proteins A WPC 80 concentrate of about 20% total solids (whey product obtained from hard cheese manufacturing, comprising 80% protein of total solids) was passed through a weak cation exchanger (Imac HP336 from Rohm & Haas) loaded in a mixed Na and K ionic form reflecting the Na/K ratio of milk. The calcium content was reduced to about 0.02% on total solids which corresponds to a reduction by about 95%.

The protein content was adjusted to about 8.0% and pH adjusted to about 8.0. The solution was heated for 30 min at 80° C. After cooling to about 15° C. the solution was diluted to about 4.0% protein, and pH adjusted to about 6.5. Calcium concentration was raised from about 0.3 mM in the decalcified sample to 7 mM Ca and salt was furthermore added in various concentrations. Samples were portioned in test tubes and put in the refrigerator. After two days in the refrigerator the contents of the test tubes were inspected with the following characteristics as shown in FIG. 1.

The desired gel type is a translucent gel gradually formed after the onset of acid gelation. This type of gel is of fine stranded character, which means that it has a good water binding capacity. The required parameters for this gel structure to be formed is illustrated in FIG. 1. To have a gel strong enough to give the right mouthfeel and stability, a higher protein content in the water phase may be needed or e.g 5% in the water phase.

The white particulate gel structure depicted in FIG. 1 represents a gel type with low water binding capacity not very well suited for stabilising the water phase of a spread.

At pH lower than 6.5 e.g 5.7-6.0 the translucent, it is critical to reduce calcium concentrations to about 0.3-0.5 mM in the water phase of the spread formulation in order to obtain a fine stranded gel.

Normally, the salt content in a spread is about 1-1.2%. This corresponds to about 285-342 mM NaCl in the water phase of a spread with 40% fat. However, salt concentrations of low fat spreads may vary between 0.5 and 4.5%. Preferred salt concentrations thus include: 1.0; 1.1; 1.2; 1.3; 1.4; 1.5; 2.0; 2.5; 3.0; 3.5; 4.0; 4.5%.

Example 2

Properties of Decalcified Whey Protein Gels

At 40° C. an aqueous solution was prepared comprising: 7.9% calcium reduced whey protein (table 1) WPC80 (the composition thereof described in example 1) and 0.1% K-sorbate. pH was adjusted to about 8 with NaOH. Then the solution was heated to 80° C. and transferred to a tank with heat jacket at 80° C. After the specified holding time (0, 7.5 or 15 minutes), the product was pumped out of the tank and cooled to 10° C. Inlet and outlet rates were balanced in order to obtain a steady state level in the heating tank. Heating and cooling of the solution was performed in scraped surface heat exchangers with steam or icewater as energy transfer mediums. After cooling, an aqueous solution of lactic acid and NaCl was added to the protein solution until a pH value of about 5.7-6.3 was reached. At this step, the protein solution was diluted according to the experimental design to 5.1-6.3%, table 1. The concentration of NaCl in the final protein solution was 1.9%. 250 or 115 ml samples were collected and stored at 5° C.

TABLE 1

Experimental design for production of WPC80 gels.

| Protein concentration (%) | Temperature (° C.) | Time (min) | pH |
| --- | --- | --- | --- |
| 5.1 | 70 | 0 | 6 |
| 5.1 | 70 | 15 | 5.7 |
| 5.1 | 80 | 7.5 | 5.7 |
| 5.1 | 90 | 0 | 5.7 |
| 5.1 | 90 | 0 | 6.3 |
| 5.1 | 90 | 15 | 5.7 |

TABLE 1-continued

Experimental design for production of WPC80 gels.

| Protein concentration (%) | Temperature (° C.) | Time (min) | pH |
| --- | --- | --- | --- |
| 5.7 | 70 | 7.5 | 6 |
| 5.7 | 80 | 0 | 6 |
| 5.7 | 80 | 7.5 | 5.7 |
| 5.7 | 80 | 7.5 | 6 |
| 5.7 | 80 | 7.5 | 6.3 |
| 5.7 | 80 | 7.5 | 6 |
| 5.7 | 80 | 7.5 | 3 |
| 5.7 | 80 | 15 | 3 |
| 5.7 | 90 | 7.5 | 6 |
| 6.3 | 70 | 0 | 6.3 |
| 6.3 | 70 | 0 | 6.3 |
| 6.3 | 70 | 15 | 5.7 |
| 6.3 | 80 | 7.5 | 6.3 |
| 6.3 | 90 | 0 | 5.7 |
| 6.3 | 90 | 15 | 6.3 |
| 6.3 | 90 | 15 | 3 |

Gel firmness was measured at 5° C. on a Texture Analyser (TA XT plus) one week after production. A 6.0 mm cylinder was pressed 8 mm into an undisturbed gel. The trigger force was 1.0 g and the test speed 2.0 mm/sec.

Figure 2:
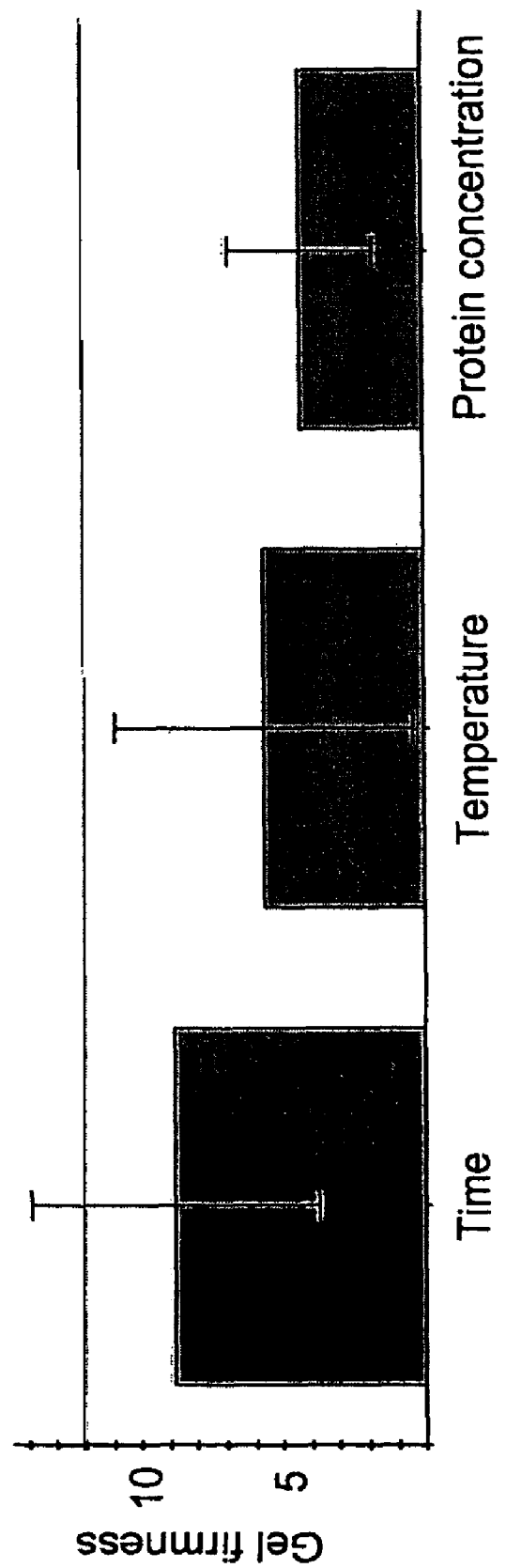
FIG. 2: Relative importance (regression coefficients) of time and temperature of the heat treatment and of the protein concentration on gel firmness of a calcium depleted whey protein solution. Error bars represent 95% confidence intervals.

FIG. 2 shows how gel firmness relates to the protein concentration, and to the heat treatment. Variation of the pH in the range 5.7-6.3 had no influence on gel firmness, whereas protein concentration, and heat treatment (time and temperature) had significant influence on gel firmness. Thus, a significant increase in gel firmness was obtained by increased time and temperature of the heat treatment and by increased protein concentration.

Example 3

Emulsification of Heat Treated Whey Protein Solution and Butter/Rapeseed Oil A 5.7% WPC80 solution was prepared according to example 2. The heat treatment was performed at 80° C./15 min and the solution was acidified to pH 5.7. The concentration of NaCl was 1.9%.

At 10° C. in an APV butter blend pilot plant, 35.1 parts sweet butter (85.5% fat, 13.0% water and 1.5% Solid Non Fat) was mixed with 22.5 parts rapeseed oil, 3.7 parts lactic culture and 69.7 parts WPC80 solution. The product was tapped in 250 g tubs and placed for storage at 5° C. The composition is shown in table 2.

TABLE 2

Compostion of low fat butter blend stabilised with a heat treated calcium depleted WPC80 solution.

| Component | (%) | Analysis method |
| --- | --- | --- |
| Fat | 39.7 | IDF*) 5B: 1986 |
| Water | 54.9 | IDF 10: 1960 |
| Solid Non Fat | 5.4 | IDF 11A 1986 |
| Salt | 1.2 | IDF 12C: 2000 |
| Protein (N*6.38) | 3.2 | IDF 20B: 1993 |

*)IDF = International Dairy Federation.

The firmness of the blend product two weeks after production was measured at 7° C. on a Texture Analyser (TA XT plus). A 60° cone was pressed 8.0 mm into the product at a speed of 12 mm/min, table 3.

TABLE 3

Firmnes of 40% fat blend product stabilised
with heat treated decalcified WPC80.

| Weeks after production | 1 | 10 |
|---|---|---|
| Loading in g | 110 | 115 |

Figure 3:
FIG. 3: Spreadability on a 40% fat spread product stabilised with A) decalcified heat treated WPC80; the product was spread at 6.5° C. eight weeks after production. B) (Comparison) WPI 9224, whey protein isolate; the product was spread at 6.5° C. eight weeks after production.
Figure 3:

7±2 g low fat spread product (temperature: 6.5° C.) was spread on a cardboard with a kitchen knife four weeks after production. The product was homogenous and did not release water upon spreading (FIG. 3A).

A sensory taste was performed one and ten weeks after production. In both cases, the product had a pure butter taste with a nut note from the whey protein. The melt down in mouth was quick and complete.

Example 4

Comparison

A commercial whey protein (Arla Foods Ingredient WPI 9224) containing 88% protein and 0.1% calcium was dissolved, heat treated, and emulsified into a fat phase as described in example 3. The product composition is shown in table 4.

TABLE 4

Composition of Arla Foods WPI 9224

|  | (%) |
|---|---|
| Protein (Nx6.38) | 88 |
| β lactoglobulin | 55 |
| Lactose | 0.2 |
| Fat | 0.3 |
| Ash | 1.6 |
| Ca | 0.10 |

When spread at a cardboard under similar conditions as in Example 3, the product was not homogenous and leaked water (FIG. 3B).

TABLE 4

Compostion of low fat butter blend stabilised
with a heat treated WPI 9224 solution.

| Component | (%) | Analysis method |
|---|---|---|
| Fat | 41.5 | IDF 5B: 1986 |
| Water | 53.6 | IDF 10: 1960 |
| Solid non fat | 4.9 | Calculated |
| Salt | 1.0 | IDF 12C: 2000 |
| Protein (N*6.38) | 3.0 | IDF 20B: 1993 |

Example 5

Effect of an Additional Second Heat Treatment after Addition of Acid, Salt, and Water A 5.7% WPC80 solution was prepared according to Example 2. The heat treatment was performed at 80° C./15 min. The solution was acidified to pH 6.0 and had a salt content of 1.9%. After the acidification, the solution was divided in two, of which one half was tapped immediately, whereas the other half was put through a second heat treatment performed at 30° C./15 min followed by cooling to 10° C. The second heat treatment resulted in less firm gels when compared to gels produced without this step (table 5).

TABLE 5

Firmness on 1 and 10 week old gels produced
according to example two with or without a second
heat treatment at 30° C./15 min.

| Weeks after production | 1 | 1 | 10 | 10 |
|---|---|---|---|---|
| Second heat treatment | Yes | No | Yes | No |
| Loading in g | 17 | 13 | 31 | 14 |

Example 6

Stabilization of a Water Phase (Yoghurt) with a Whey Protein Gel

A whey protein retentate containing 80% protein in total solids was made from sweet whey by ultrafiltration. This retentate was decalcified by ion exchange to reach a calcium content of about 0.03% on total solids and diluted to a protein content of 8% as previously described in example 1. pH was adjusted to 7.5 and the solution was heat treated at 80° C. for 15 min. The concentrate was immediately cooled to 4° C.

100 l milk with 0.5% fat was homogenised and heat treated in the normal way for yoghurt production at 95° C. for 15 min. To the heat treated yoghurt milk was added 8 kg of the heat treated and cooled decalcified whey protein concentrate immediately before inoculation in a sterile mode. The fermentation was made at 42° C. When the fermentation was finished and cooling was made to 20° C., gently stirring of the product was performed. Finally the yoghurt was cooled to refrigerator temperature.

The consistency of the product was much improved in comparison to a product wherein the same amount of native whey protein concentrate had been added before heat treatment of the milk. The viscosity measured by a conventional rotating viscosimeter was 80% higher in the product made with the decalcified heat treated whey protein concentrate. The stability against whey release during storage for three weeks was also much improved.

It thus turns out that the whey protein gels produced by the methods of the present invention are not only useful for stabilising fat phases but unexpectedly also useful for stabilising a water phase such as yoghurt.

Example 7

Stabilization of a Water Phase (Fresh Cheese) with Whey Protein Gel

A low fat fresh cheese is produced by standardizing the fat content of butter milk to about 1.4% fat by addition of cream. The standardized milk is then homogenized at about 200 bar at about 70° C. and subsequently pasteurized at about 95° C. for about 5 minutes. About 1% starter culture and rennet is added and the milk is now fermented for 18-24 hours at about 21° C. to a achieve a pH value of about 4.6. Prior to performing ultrafiltration or traditional separation (using either a quarg separator or a cream cheese separator) of the coagulated product, it is heated to about 60° C. for about 3 minutes. The curdled cheese is ultrafiltrated at about 40° C. in order to arrive at a solid content of the cream cheese retentate of about 33%. An aqueous solution of 20% NaCl is added to the cream cheese in order to obtain a total salt concentration of about 0775% in the product. In order to increase the shelf life of the product, a heating step is performed at about 75°. The cream cheese thus obtained has a fat content of about 6%.

A whey protein solution is prepared in parallel. At 40° C. an aqueous solution is prepared comprising 7.9% calcium depleted whey protein WPC80 (about 0.6 mM calcium) and 0.1% K-sorbate. The pH is adjusted to about 8 with NaOH. The solution is heated to about 80° C. and transferred to a tank with heat jacket at about 80° C. The solution is optionally cooled.

The cream cheese obtained above is mixed with the protein solution in a ratio of about 9:1. As the pH value of the cream cheese is below 7 and the calcium concentration is relatively high, mixing the two phases will catalyze gel formation resulting in increased viscosity of the cream cheese product. See e.g. also Britten & Giroux, *Food Hydrocolloids* 15 (2001) 609-617. Homogenization at about 5-10 MPa may optionally be performed in order to further increase the firmness of the cheese.

The product is finally cooled and packed in containers. After about a week at 5° C., the product is ready for distribution and sale.

The invention claimed is:

1. A whey protein product obtainable by a method selected from (A) and (B) wherein
   method (A) comprises the following steps:
   (i) preparing an aqueous solution comprising about 5 to 10% whey protein, wherein the aqueous solution has a calcium concentration of about 0.0 to 1.4 mM and a pH value of about 7 to 9,
   (ii) heating the solution resulting from step (i) to a temperature of about 50 to 100° C. for about 0.15 to 30 minutes,
   (iii) cooling the solution resulting from step (ii) to a temperature of about 1 to 40° C., and
   (iv) adjusting the solution resulting from step (iii) to a protein concentration of about 4 to 7%, and a pH value of about 5.2 to 7.0; and
   method (B) comprises the following steps:
   (v) preparing an aqueous solution comprising about 3-10% whey protein, a pH value of about 7 to 9, wherein the calcium concentration of the whey protein is 1.4 mM or less or has been reduced to at least 1 mM or less
   (vi) heating the solution resulting from step (v) to a temperature of about 50 to 100° C. for about 0.15 to 30 minutes,
   (vii) cooling the solution resulting from step (vi) to a temperature of about 1 to 17° C., and
   (viii) adjusting the solution resulting from step (vii) to a protein concentration of about 5 to 7% and a pH value of about 5.5 to 7.

2. A whey protein product according to claim 1, wherein the calcium concentration of the whey protein in step (v) of method (B) has been reduced at least about 98%.

3. A whey protein product low fat spread according to claim 1, wherein the whey protein is enriched with β lactoglobulin.

4. A food product comprising a whey protein product according to claim 1.

5. The method of claim 1, wherein the cooling of the solution in step (iii) of method (A) is to a temperature of about 1 to 17° C.

6. The method of claim 1, wherein the pH value in step (iv) of method (A) is adjusted to about 5.5-7.

7. The method of claim 1, wherein the cooling of the solution in step (iii) of method (A) is to a temperature of about 1 to 17° C. and wherein the pH value in step (iv) of method (A) is adjusted to about 5.5-7.

8. A low fat spread obtainable by a method selected from (A), (B), and (C) wherein method (A) comprises the following steps:
   (i) preparing an aqueous solution comprising about 5 to 10% whey protein, wherein the aqueous solution has a calcium concentration of about 0.0 to 1.4 mM and a pH value of about 7 to 9,
   (ii) heating the solution resulting from step (i) to a temperature of about 50 to 100° C. for about 0.15 to 30 minutes,
   (iii) cooling the solution resulting from step (ii) to a temperature of about 1 to 40° C.,
   (iv) adjusting the solution resulting from step (iii) to a protein concentration of about 4 to 7%, and a pH value of about 5.2 to 7.0, and
   (v) mixing the solution resulting from step (iv) with a fat phase in order to obtain a low fat spread;
   method (B) comprises the following steps:
   (vi) preparing an aqueous solution comprising about 3-10% whey protein, with a pH value of about 7 to 9, wherein the calcium concentration of the whey protein is 1.4 mM or less or has been reduced to at least 1 mM or less,
   (vii) heating the solution resulting from step (vi) to a temperature of about 50-100° C. for about 0.15 to 30 minutes,
   (viii) cooling the solution resulting from step (vii) to a temperature of about 1 to 17° C.,
   (ix) adjusting the solution resulting from step (viii) to a protein concentration of about 5 to 7% and a pH value of about 5.5 to 7, and
   (x) mixing the solution resulting from step (ix) with a fat phase in order to obtain a low fat spread; and
   method (C) comprises the following steps:
   (xi) preparing an aqueous solution comprising about 7.9% whey protein, a calcium concentration of about 0.0 to 1.4 mM, and a pH value of about 8,
   (xii) heating the solution resulting from step (xi) to a temperature of about 80° C. for about 15 minutes,
   (xiii) cooling the solution resulting from step (xii) to a temperature of about 10° C.,
   (xiv) adjusting the solution resulting from step (xiii) to a protein concentration of about 5.7%, adjusting the pH value to about 5.7 by addition of an aqueous solution of lactic acid, and adding NaCl to a concentration of about 1.9%, and
   (xv) mixing 53 parts of the water phase resulting from step (xiv) with 27 parts butter, and 17 parts rapeseed oil in order to obtain a low fat spread.

9. A low fat spread according to claim 8, wherein the whey protein is enriched with β lactoglobulin.

10. A low fat spread according to claim 8, wherein the calcium concentration in step (vi) of method (B) has been reduced at least about 98%.

* * * * *